(12) United States Patent
White et al.

(10) Patent No.: US 6,299,996 B1
(45) Date of Patent: Oct. 9, 2001

(54) FUEL CELL SYSTEM

(75) Inventors: Eric T. White, Guilderland Ctr; Edward W. Nestler, Jr., Rensselear; Chock Karuppaiah, Watervliet, all of NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/405,689

(22) Filed: Sep. 24, 1999

(51) Int. Cl.⁷ .................................................. H01M 8/04
(52) U.S. Cl. .................................. 429/22; 429/19; 429/23
(58) Field of Search .............................. 429/12, 13, 17, 429/19, 22, 23, 30

(56) References Cited

U.S. PATENT DOCUMENTS

| | | | |
|---|---|---|---|
| 4,294,892 | 10/1981 | Alfenaar | 429/13 |
| 4,537,839 | 8/1985 | Cameron | 429/20 |
| 4,755,439 | 7/1988 | Trocciola et al. | 429/22 |
| 4,910,099 | 3/1990 | Gottesfeld | 429/13 |
| 4,988,583 | 1/1991 | Watkins et al. | 429/30 |
| 5,432,021 | 7/1995 | Wilkinson et al. | 429/17 |
| 5,441,821 | 8/1995 | Merritt et al. | 429/17 |
| 5,547,776 | 8/1996 | Fletcher et al. | 429/13 |
| 5,637,415 | 6/1997 | Melyser et al. | 429/17 |
| 5,773,160 | 6/1998 | Wilkinson et al. | 429/13 |
| 6,007,931 | 12/1999 | Fuller et al. | 429/13 |
| 6,013,385 | 1/2000 | DuBose | 429/17 |
| 6,096,448 * | 8/2000 | Wilkinson et al. | 429/13 |

FOREIGN PATENT DOCUMENTS 2-30068    1/1990  (JP).

* cited by examiner

Primary Examiner—Stephen Kalafut
Assistant Examiner—Jonathan Crepeau
(74) Attorney, Agent, or Firm—Fish & Richardson P.C.

(57) ABSTRACT

The invention relates to a fuel cell system. The system has one operational state in which a fuel gas supply is connected to the anode flow field plates along a flow path. The system also has a different operational state in which the anode flow field plates are disconnected from the fuel gas supply and connected to an oxidant gas supply along a flow path. The fuel cell system can use a valve and a control system to switch the operational state of the system.

6 Claims, 6 Drawing Sheets

FUEL CELL SYSTEM

BACKGROUND OF THE INVENTION

A fuel cell can convert chemical energy to electrical energy by promoting a chemical reaction between two reactant gases.

One type of fuel cell includes a cathode flow field plate, an anode flow field plate, a membrane electrode assembly disposed between the cathode flow field plate and the anode flow field plate, and gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each reactant flow field plate has an inlet region, an outlet region and open-faced channels connecting the inlet region to the outlet region and providing a way for distributing the reactant gases to the membrane electrode assembly.

The membrane electrode assembly usually includes a solid electrolyte (e.g., a proton exchange membrane) between a first catalyst and a second catalyst. One gas diffusion layer is between the first catalyst and the anode flow field plate, and another gas diffusion layer is between the second catalyst and the cathode flow field plate.

During operation of the fuel cell, one of the reactant gases (the anode reactant gas) enters the anode flow field plate at the inlet region of the anode flow field plate and flows through the channels of the anode flow field plate toward the outlet region of the anode flow field plate. The other reactant gas (the cathode reactant gas) enters the cathode flow field plate at the inlet region of the cathode flow field plate and flows through the channels of the cathode flow field plate toward the cathode flow field plate outlet region.

As the anode reactant gas flows through the channels of the anode flow field plate, some of the anode reactant gas passes through the anode gas diffusion layer and interacts with the anode catalyst. Similarly, as the cathode reactant gas flows through the channels of the cathode flow field plate, some of the cathode reactant gas passes through the cathode gas diffusion layer and interacts with the cathode catalyst.

The anode catalyst interacts with the anode reactant gas to catalyze the conversion of the anode reactant gas to reaction intermediates. The reaction intermediates include ions and electrons. The cathode catalyst interacts with the cathode reactant gas and the reaction intermediates to catalyze the conversion of the cathode reactant gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and reactant gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode reactant gas undergoes oxidation during the fuel cell reaction. Because electrons are consumed at the cathode side of the membrane electrode assembly, that means the cathode reactant gas undergoes reduction during the fuel cell reaction.

For example, when molecular hydrogen and molecular oxygen are the reactant gases used in a fuel cell, the molecular hydrogen flows through the anode flow field plate and undergoes oxidation. The molecular oxygen flows through the cathode flow field plate and undergoes reduction. The specific reactions that occur in the fuel cell are represented in equations 1–3.

$$H_2 \rightarrow 2H^+ + 2e^- \quad (1)$$
$$\tfrac{1}{2}O_2 + 2H^+ + 2e^- \rightarrow H_2O \quad (2)$$
$$H_2 + \tfrac{1}{2}O_2 \rightarrow H_2O \quad (3)$$

As shown in equation 1, the molecular hydrogen forms protons (H$^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the molecular oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY OF THE INVENTION

The invention relates to a fuel cell system having two operational states, namely a first operational state and a second operational state. In the first operational state, the anode flow field plates are connected to a fuel gas supply along a flow path. In the second operational state, the anode flow field plates are disconnected from the fuel gas supply and connected to an oxidant gas supply along a flow path. The second operational state can be used when a low system power output is desired, such as when the fuel cell system is in an idle state.

One potential advantage of the invention is that operating the system in the second operational state can reduce the amount of contamination of the fuel cells contained in the system relative to an otherwise substantially identical system that has only one of the operational states.

Another potential advantage of the invention is that the system power output in the first operational state can be maintained at a high level without substantial degradation by periodically operating the system in the second operational state. In other words, periodically using the second operational state can reduce the tendency of the system power output in the first operational state to decrease over time relative to prior art systems.

A further potential advantage of the invention is that the useful lifetime of the fuel cell system, as measured by the amount of time it takes for the system power output to drop below a predetermined level, can be increased relative to prior art systems.

In general, in one aspect, the invention is a fuel cell system which includes a fuel cell and a gas distribution system. The fuel cell includes a cathode flow field plate, an anode flow field plate, and an electrolyte between the cathode and anode flow field plates. The gas distribution system has an oxidant gas inlet for receiving an oxidant gas and an oxidant gas outlet for outputting the oxidant gas. The oxidant gas outlet is connected to the inlet of the anode flow field plate. The gas distribution system includes a first valve with a first position in which the gas distribution system provides a first flow path from the oxidant gas outlet to the inlet of the anode flow field plate and a second position which blocks the first flow path so that the oxidant gas is blocked from flowing from the oxidant gas outlet to the inlet of the anode flow field plate.

The electrolyte can be a solid electrolyte (e.g., a proton exchange membrane).

The oxidant gas outlet can be connected to the cathode flow field plate inlet along a second flow path different than the first flow path.

The gas distribution system can further include a fuel gas inlet for receiving a fuel gas and a fuel gas outlet for outputting a fuel gas. The fuel gas outlet is connected to the inlet of the anode flow field plate. The gas distribution system including a second valve which has a first position in which the gas distribution system provides a third flow path from the fuel gas outlet to the inlet of the anode flow field plate and a second position which blocks the third flow path so that the fuel gas is blocked from flowing from the fuel gas outlet to the inlet of the anode flow field plate, the third flow path being different than the first and second flow paths.

The fuel cell system can also include a controller that controls the first and second valves by setting the positions of the first and second valves. The controller can set the first valve to its first position and the second valve to its second position, and the controller can set the first valve to its second position and the second valve to its first position.

The oxidant gas inlet can be connected to a second fuel gas inlet and further include a third valve which has a first position in which the gas distribution system provides a third flow path from the oxidant gas outlet to the second fuel gas inlet and a second position which blocks the third flow path so that the oxidant gas is blocked from flowing from the oxidant gas outlet to the second fuel gas outlet, the third flow path being different than the first and second flow paths. The controller can control the third valve by setting its position. The controller can set the position of the third valve to be the same as the position of the second valve.

In general, in another aspect, the invention is a fuel cell system which includes a fuel cell and a gas distribution system. The fuel cell has a cathode flow field plate, an anode flow field plate and an electrolyte between the cathode and anode flow field plates. The gas distribution system has an oxidant gas inlet for receiving an oxidant gas, an oxidant gas outlet for outputting the oxidant gas, a fuel gas inlet for receiving a fuel gas, a fuel gas outlet for outputting the fuel gas. The oxidant gas outlet is connected to the inlet of the anode flogs field plate, and the fuel gas outlet is connected to the inlet of the anode flow field plate. The gas distribution system including first and second valves. The first valve has a first position in which the gas distribution system provides a first flow path from the oxidant gas outlet to the inlet of the anode flow field plate and a second position which blocks the first flow path so that the oxidant gas is blocked from flowing from the oxidant gas outlet to the inlet of the anode flow field plate. The second valve has a first position in which the fuel gas outlet is connected to the inlet of the anode flow field plate along a second flow path and a second position in which the second flow path is blocked so that the fuel gas is blocked from flowing from the fuel gas outlet to the inlet of the anode flow field plate.

In general, in a further aspect, the invention is a method of operating a fuel cell. The method includes flowing a first oxidant gas stream through the cathode flow field plate channels at a first oxidant gas stream rate, and flowing a fuel gas stream through the anode flow field plate channels at a fuel gas stream rate. The method then includes flowing a second oxidant gas stream through the anode flow field plate channels.

The method can also include, while flowing the second oxidant gas stream through the anode flow field plate channels, simultaneously flowing the first oxidant gas stream through the cathode flow field plate channels.

The method can further include, prior to flowing the second oxidant gas through the anode flow field plate channels, reacting within the fuel cell molecular oxygen contained in the first oxidant gas stream with molecular hydrogen contained in the fuel gas stream to a first electrical power output of the fuel cell.

The method can further include, after flowing the second oxidant gas through the anode flow field plate channels, flowing the first oxidant gas stream through the cathode flow field plate channels at the first oxidant gas stream flow rate, flowing the fuel gas stream through the anode flow field plate channels at the fuel gas stream flow rate, and, within the fuel cell, reacting molecular oxygen contained in the first oxidant gas stream with the molecular hydrogen contained in the fuel gas stream to provide a second electrical power output of the fuel cell greater than the first electrical power output of the fuel cell.

In some embodiments, flowing the first oxidant gas stream through the cathode flow field plate channels and flowing the second oxidant gas stream through the anode flow field plate channels produces substantially no electrical power output from the fuel cell.

The method can include humidifying the second oxidant gas stream prior to flowing the second oxidant gas stream through the channels of the anode flow field plate.

The method can further include, after flowing the first oxidant gas stream through the channels in the cathode flow field plate, diverting a portion of the first oxidant gas stream to form the second oxidant gas stream.

The mass flow rate of the second oxidant gas stream can be relatively high (e.g., at least about 2.5 standard liters per minute per 50 square centimeters of active area) or relatively low (e.g., less than about 1. standard liter per minute per 50 square centimeters of active area).

As used herein, "active area" refers to the area of catalyst on the anode flow field plate side of a fuel cell in a direction perpendicular to the flow of anode gas through the channels in the anode flow field plate.

Other features and advantages of the invention will be apparent from the detailed description and the drawings.

DETAILED DESCRIPTION

Figure 1:
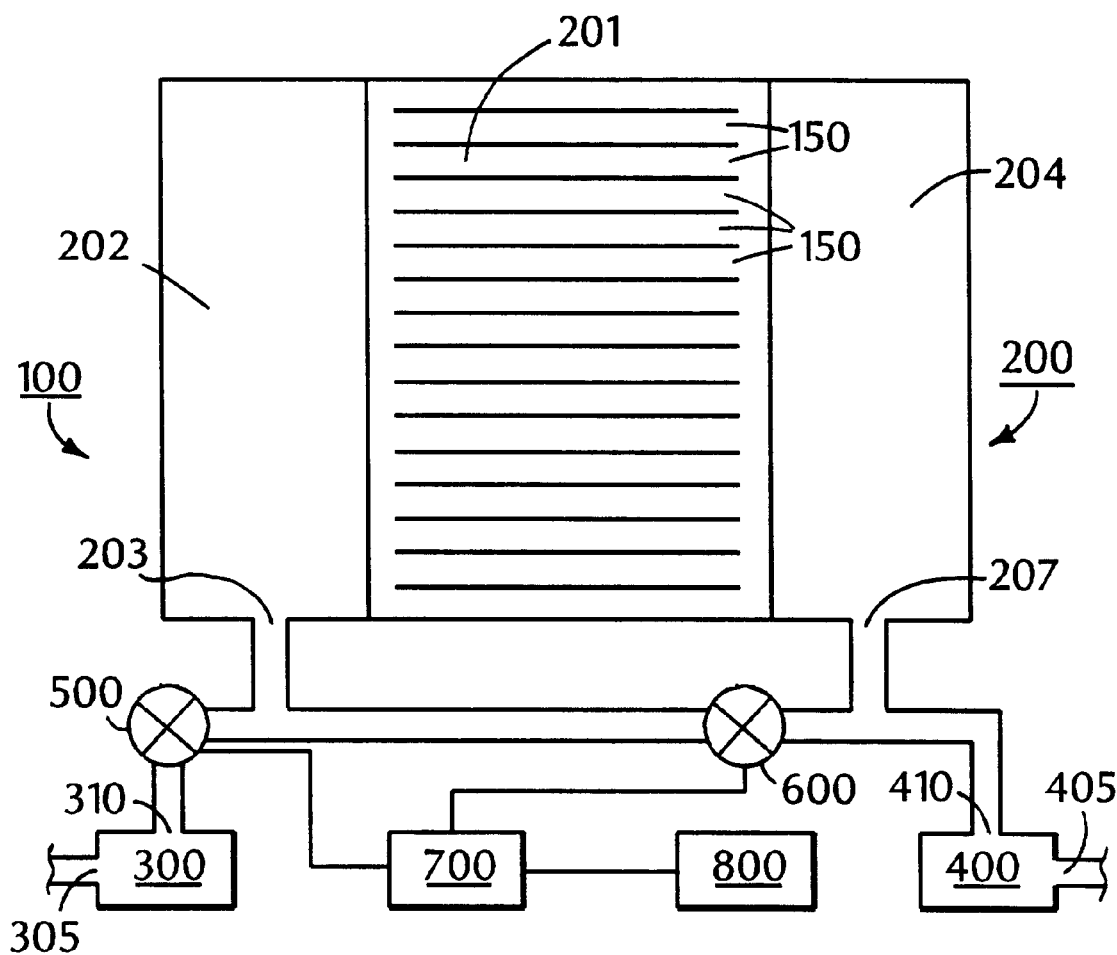
FIG. 1 is a schematic representation of a system according to one embodiment of the invention.

FIG. 1 shows one embodiment of a system 100 having two different operational states. System 100 includes a fuel cell stack 200 having an active area 201 containing fuel cells 150, an anode gas input manifold 202 with an inlet 203, and a cathode gas input manifold 204 with an inlet 207; a fuel gas supply 300 having an inlet 305 and an outlet 310; an oxidant gas supply 400 having an inlet 405 and an outlet 410; a valve 500; a valve 600; a controller 700 in electrical communication with valves 500 and 600; and a sensor 800 in electrical communication with controller 700. Typically, sensor 800 is part of a power conditioning system that senses the power output desired from fuel cell system 100. Valve 500 is between fuel gas supply outlet 310 and inlet 203 of anode gas input manifold inlet 202 along a flow path, and valve 600 is between oxidant gas supply outlet 410 and inlet 203 along a different flow path.

Figure 4:
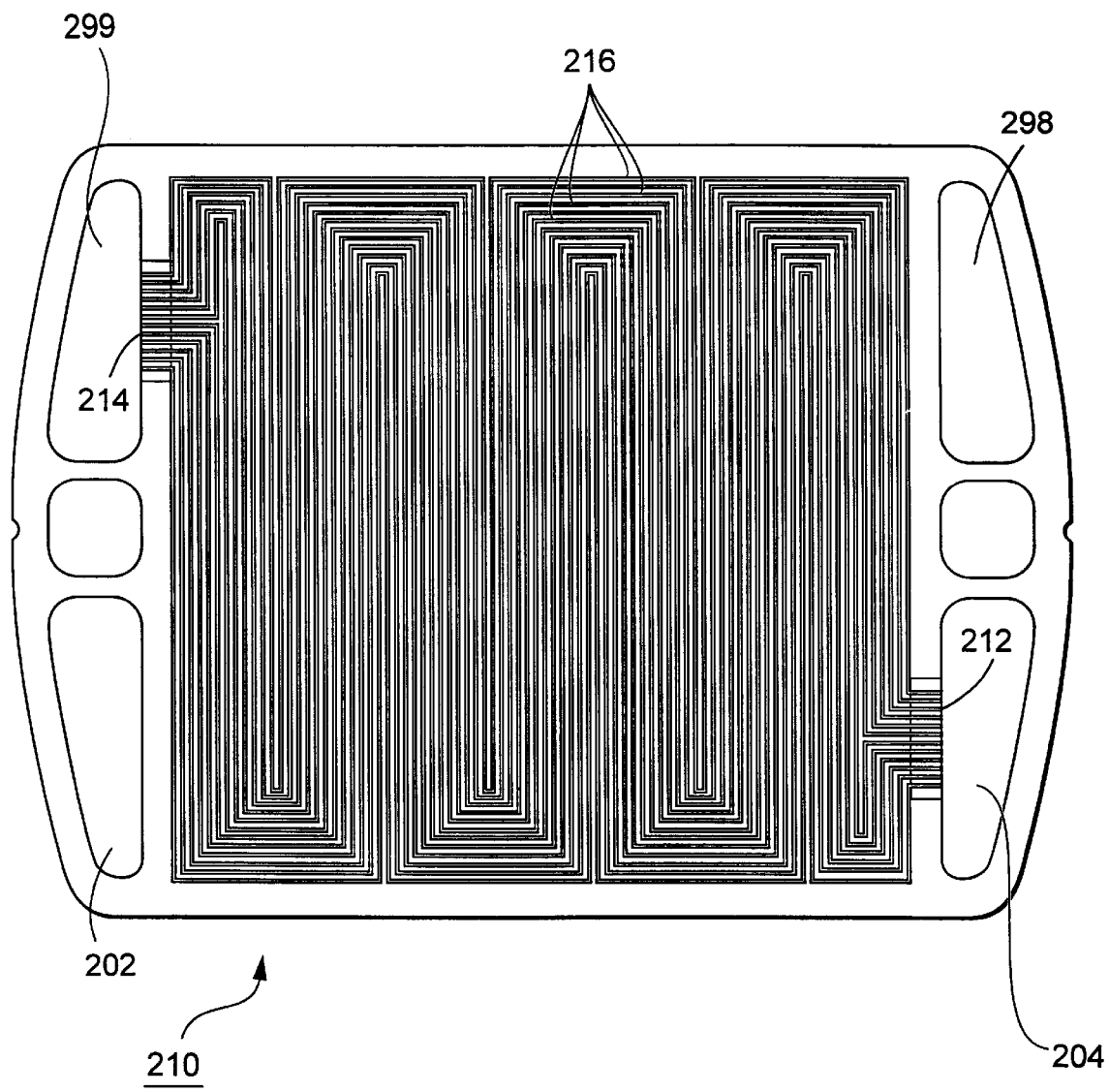
FIG. 4 is an elevational view of an embodiment of an anode flow field plate.
Figure 5:
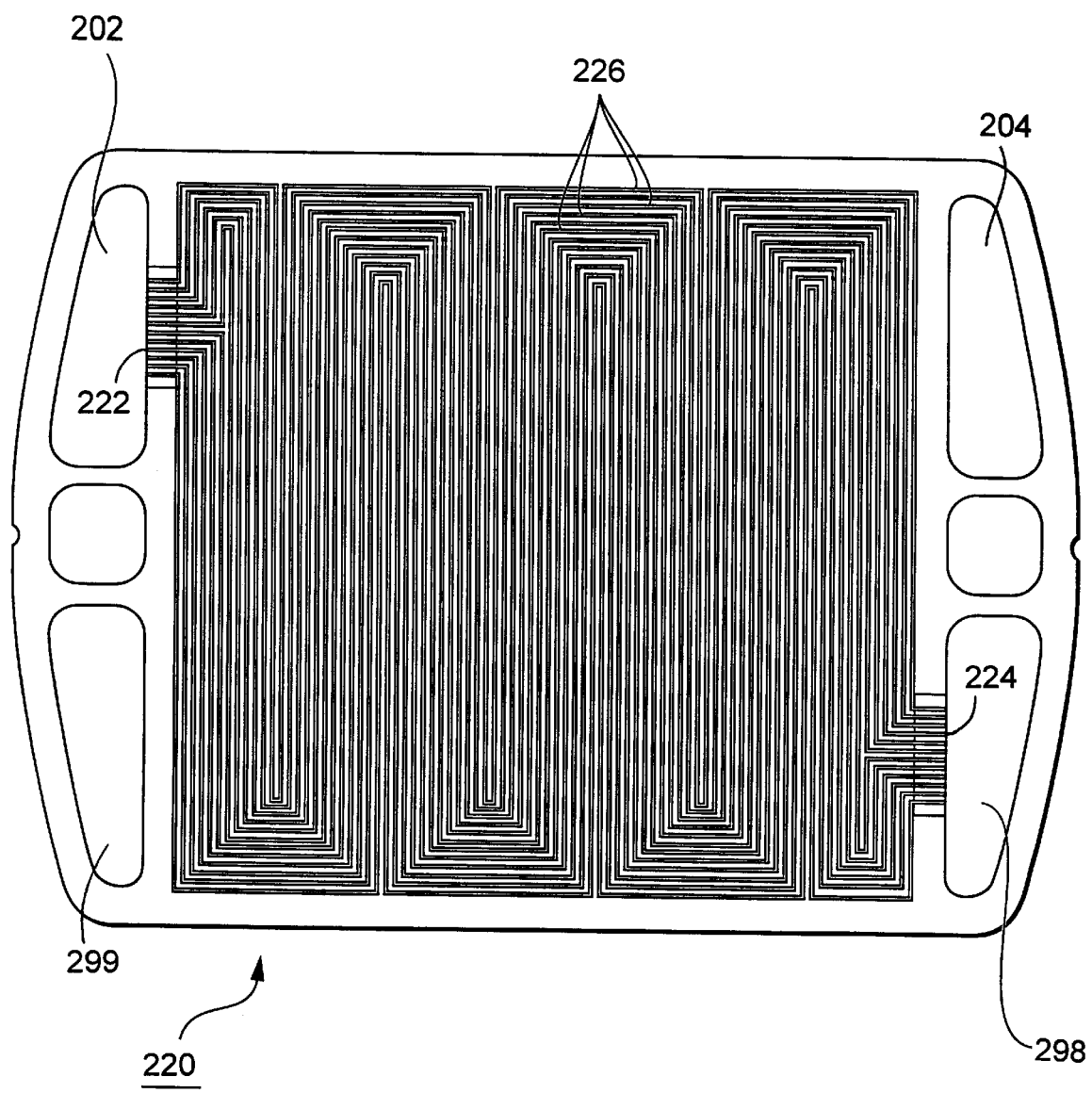
FIG. 5 is an elevational view of an embodiment of a cathode flow field plate.

When sensor 800 detects that an electrical power output is desired from system 100, controller 700 closes valve 600 and opens valve 500. In this operational state, the fuel gas flows through system 100 from fuel gas supply outlet 310 to inlet 203 of anode gas input manifold 202 then along manifold 202. The oxidant gas flows through system 100 from oxidant gas supply outlet 410 to inlet 207 of cathode gas input manifold 204 then along manifold 204. As the fuel gas and oxidant gas flow along manifolds 202 and 204, respectively, the gases are directed through fuel cells 150. As the fuel and oxidant gases flow through fuel cells 150, some of the molecular hydrogen in the fuel gas stream and the some of the molecular oxygen in the oxidant gas react to form electricity, water and heat. A portion of the water formed, as well as the unreacted portion of the fuel gas and oxidant gas, flow through flow field plates 150 and exit system 100 via anode gas output manifold 298 and cathode gas output manifold 299, respectively (FIGS. 4 and 5).

When sensor 800 detects that electrical power is not desired from system 100, controller 700 can close valve 500 and open valves 600. In this operational state, the oxidant gas flows frog oxidant gas supply outlet 410 through manifold 204 as discussed above. The oxidant gas also flows from oxidant gas supply outlet 410 to manifold inlet 203 of anode gas input manifold 202 and along manifold 202. The oxidant gas then flows through fuel cells 150 to anode gas output manifold 298. In this operational state, the fuel gas does not flow through system 100, so substantially no electrical power is produced by system 100.

Without wishing to be bound by any theories, it is believed that the flow of the oxidant gas outlet 310 to inlet 203 through manifold 202 to manifold 298 can remove contaminants from fuel cell stack 200. Therefore, when system 100 is switched back to the first operational state, the electrical power output from system 100 for a given flow rate of oxidant and fuel gases is increased relative to the power output from system 100 at the same reactant gas flow rates prior to being switched to the second operational state.

Figure 2:
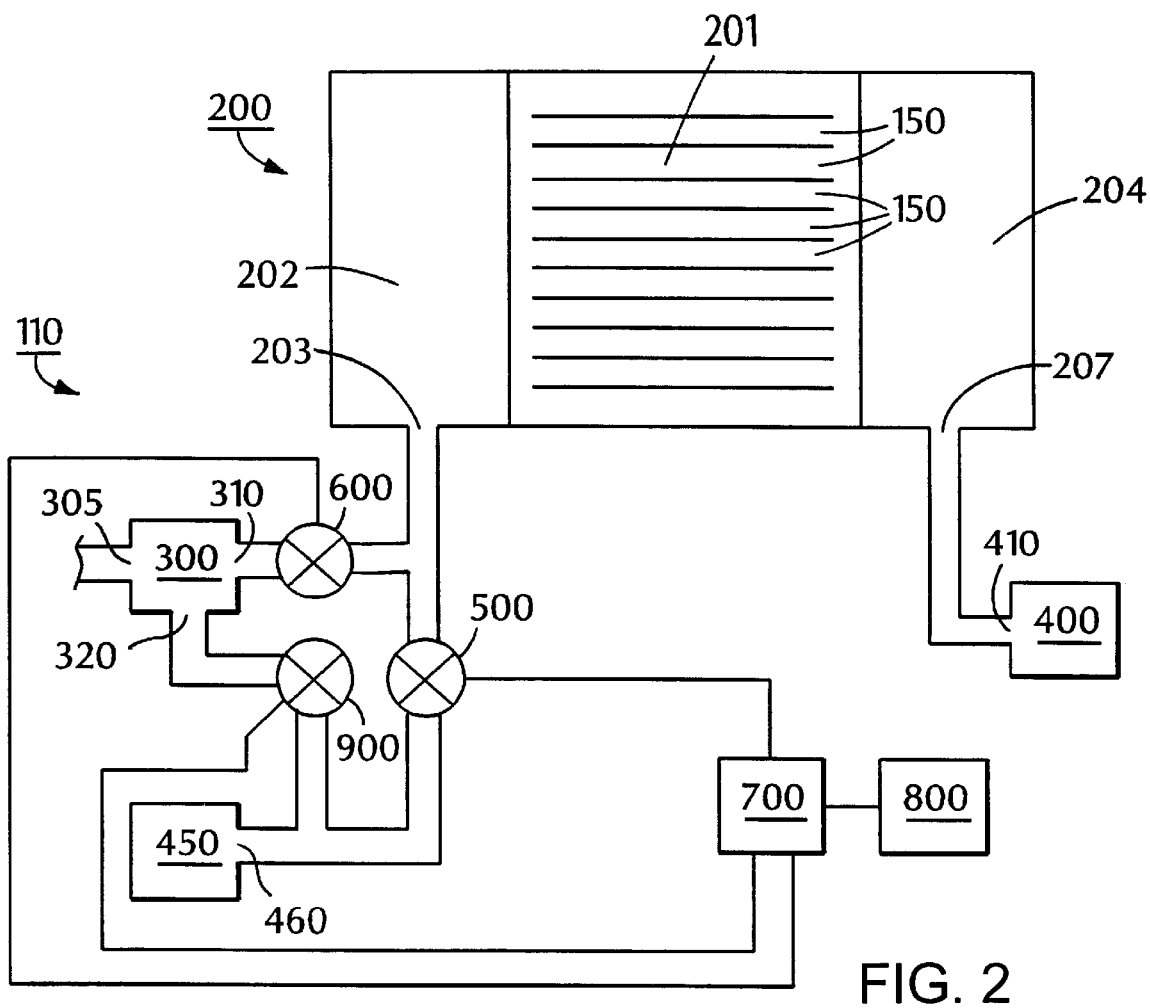
FIG. 2 is a schematic representation of a system according to another embodiment of the invention.
Figure 3:
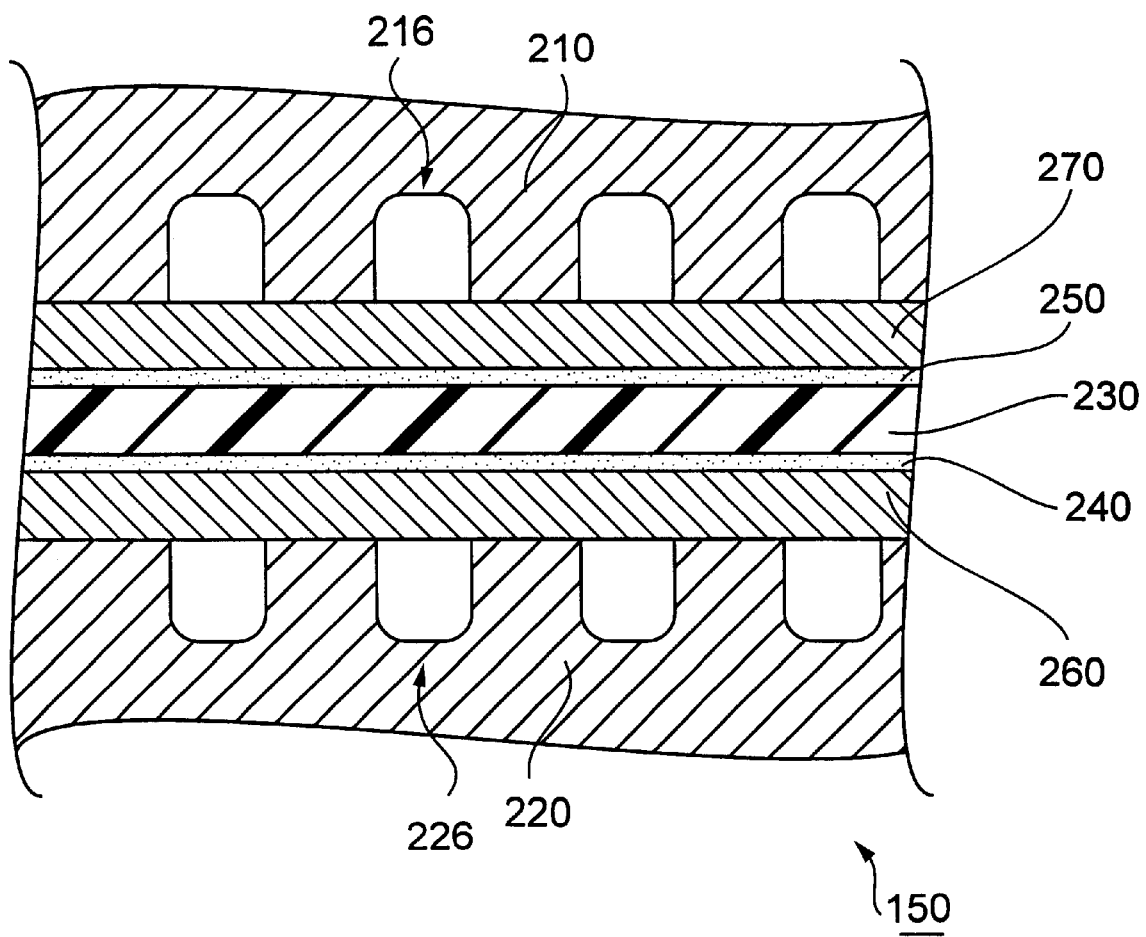
FIG. 3 is a cross-sectional view of an embodiment of a fuel cell.

In certain embodiments, it is desirable to feed oxidant gas to fuel gas supply 300 to promote one or more reactions within fuel gas supply 300 that form molecular hydrogen. For example, fuel gas supply 300 may be a reformer which forms molecular hydrogen by reacting hydrocarbons with molecular oxygen. FIG. 2 shows an embodiment of such a system 110 wherein a second oxidant gas supply 450 is used to provide fuel gas supply 300 with oxidant gas. Valve 500 is between oxidant gas supply outlet 460 and inlet 203 of anode gas input manifold 202 along a flow path, valve 600 is between fuel gas supply outlet 310 and inlet 203 of anode gas input manifold 202 along a different flow path, and valve 900 is between outlet 460 and fuel gas supply inlet 320 along still a different flow path.

When sensor 800 detects that electrical power is desired from system 110, controller 700 closes valve 500 and opens valves 600 and 900. In this operational state, oxidant gas flows from second oxidant gas supply outlet 460 to fuel gas supply inlet 320 so that a fuel gas is formed in fuel gas supply 300. The fuel gas flows through system 110 from fuel gas supply outlet 310 to inlet 203 of anode gas manifold 202, along manifold 202, and through fuel cells 150 to anode gas output manifold 298. Oxidant gas flows through system 110 from outlet 410 to inlet 207, along manifold 204, and through fuel cells 150 to cathode gas output manifold 299. The fuel and oxidant gases can react to form water, electricity and heat as discussed above.

When sensor 800 detects that electrical power is not desired from system 110, controller 700 can close valves 600 and 900 and open valve 500. In this operational state, oxidant gas does not flow from second oxidant gas supply outlet 460 to fuel gas supply inlet 320. Instead, oxidant gas flows from second oxidant gas supply outlet 460 to inlet 203 of anode gas input manifold 202, along manifold 202, and through fuel cells 150 to anode gas output manifold 298. Oxidant gas also flows from oxidant gas supply outlet 310, through manifold 204 and fuel cells 150 to manifold 299 as discussed above. No fuel gas flows through system 110 in this operational state, so substantially no electrical power is produced by system 110. As discussed above, the flow of oxidant gas through manifold 202 to fuel cells 150 and to manifold 298 can remove contaminants from fuel cell stack 200 and result in improved electrical power output from system 110.

During operation of the invention, the operational state of the system can be periodically or repeatedly switched from the first operational state to the second operational state. This can reduce the tendency of the system power output to degrade over time, with or without use (e.g., prevent substantial contamination). This can also be used to increase the system power output (e.g., regenerate a contaminated fuel cell stack).

In some embodiments, the mass flow rate of gas through the system can be adjusted. For example, the mass flow rate of oxidant gas through the anode gas input manifold can be adjusted when the system is in the second operational state. Adjustment of the gas mass flow rate (e.g., oxidant gas mass flow rate through the anode gas input manifold in the second operational state) can be determined, for example, by the level of contamination of the fuel cell stack, which can include the level of contamination in one or more fuel cells (e.g., the level of contamination of one or more of gas diffusion layers, catalysts and/or the electrolyte).

In certain embodiments, when the system is in the second operational state, the oxidant gas flowing through the anode gas input manifold can have a relatively high mass flow rate. For example, the oxidant gas mass flow rate can be at least about 2.5 standard liters per minute per 50 square centimeters of active area (e.g., at least about 3 standard liters per minute per 50 square centimeters of active area, or at least about 3.2 standard liters per minute per 50 square centimeters of active area). Such relatively high mass flow rates can be used, for example, when it is desirable to regenerate a contaminated fuel cell stack.

In some embodiments, when the system in the second operational state, the oxidant gas flowing through the anode gas input manifold can have a relatively low mass flow rate. For example, the oxidant gas mass flow rate can be less than about 1 standard liters per minute per 50 square centimeters of active area (e.g., less than about 0.75 standard liters per minute per 50 square centimeters of active area, or less than about 0.5 standard liters per minute per 50 square centimeters of active area). Such relatively low mass flow rates can be used, for example, when it is desirable to prevent a fuel cell stack from undergoing substantial contamination.

The amount of time the system is kept in the second operational state can be relatively short. For example, the system can be kept in the second operational state for less than about 30 minutes (e.g., less than about 15 minutes, or less than about 5 minutes). These time periods can be used with various oxidant gas mass flow rates such as, for example, the relatively high oxidant gas mass flow rates or the relatively low oxidant gas mass flow rates discussed above.

In one embodiment, when the system is in the second operational state, oxidant gas flows through the anode gas input manifold for about 5 minutes at a mass flow rate of about 3.2 standard liters per minute per 50 square centimeters of active area. In another embodiment, when the system is in the second operational state, oxidant gas flows through the anode gas input manifold for 5 minutes at a mass flow rate of about 0.5 standard liters per minute per 50 square centimeters of active area.

While certain oxidant gas mass flow rates and time periods have been described for using the system in the second operational state, the invention is not limited to such mass flow rates or time periods. Other mass flow rates and time periods can also be used.

The system can further include one or more valves disposed between oxidant gas supply outlet 410 and inlet 205 of cathode gas supply manifold 204 so that, when system 100 and/or system 110 is in its second operational state, the flow of oxidant gas from outlet 410 to inlet 205 is blocked. In some embodiments, this can assist in reducing or preventing the tendency of electrolyte 230 (described below) to dry out. In addition, the system can be designed so that one or more of the gas streams (e.g., the oxidant gas stream that flows through anode gas input manifold 202) are humidified prior to entering fuel cell stack 200. Methods for gas stream humidification are known to those skilled in the art.

In certain embodiments, the oxidant gas that flows through anode gas input manifold 202 when the system is in its second operational state can be provided by diverting all or some of the oxidant gas from cathode gas output manifold 299 to manifold 202. This can be done with or without humidification of the oxidant gas stream between manifold 299 and manifold 202.

Although certain embodiments of the invention have been described above, the system is not limited to such embodiments. For example, the number and placement of valves within the system can be varied to control the flow of fuel gas and oxidant gas through the system so that the system has at least the two operational states discussed above. Moreover, the types of valves used can vary depending upon the location of the valves. For example, t-valves and/or diverter valves can be used. Furthermore, the system can include an electrical power supply back-up unit, such as a battery, so that the system can supply electrical power when in its second operational state. During operation in the second operational state, it may be desirable to reduce the electrical load on the fuel cell stack to a level appropriate for or below a level corresponding to the available amount of fuel flowing through the fuel cell stack. For example, the load may be removed from the fuel cell stack during the second operational state.

The internal details of fuel cells which can be employed in the above-described systems are well know to those skilled in the art. For completeness, an illustrative fuel cell 150 will now be described with reference to FIGS. 3–6. Fuel cell 150 includes a cathode flow field plate 210, an anode flow field plate 220, a solid electrolyte 230, catalysts 240 and 250 and gas diffusion layers 260 and 270.

Electrolyte 230 is capable of allowing ions to flow therethrough while providing a substantial resistance to the flow of electrons. Electrolyte 230 is a solid polymer (e.g., a solid polymer ion exchange membrane), such as a solid polymer proton exchange membrane (e.g., a solid polymer containing sulfonic acid groups). Such membranes are commercially available from E. I. DuPont de Nemours Company (Wilmington, Del.) under the trademark NAFION. Alternatively, electrolyte 230 can also be prepared from the commercial product GORE-SELECT, available from W. L. Gore & Associates (Elkton, Md.).

Catalyst 240 is formed of a material capable of interacting with molecular hydrogen to form protons and electrons. Examples of such materials include, for example, platinum, platinum alloys, and platinum dispersed on carbon black. Methods of preparing such catalysts are know to those skilled in the art.

Catalyst 250 is formed of a material capable of interacting with molecular oxygen, electrons and protons to form water. Examples of such materials include, for example, platinum, platinum alloys, and noble metals dispersed on carbon black. Methods of preparing such catalysts are know to those skilled in the art.

Gas diffusion layers 260 and 270 are formed of a material that is both gas and liquid permeable material so that the reactant gases (e.g., molecular hydrogen and molecular oxygen) and products (e.g., water) can pass therethrough. In addition, layers 260 and 270 should be electrically conductive so that electrons can flow from catalysts 240 and 250 to flow field plates 220 and 210, respectively. Such materials may be further treated, for example, by infusing them with TEFLON® (PTFE) to improve hydrophobicity.

FIG. 4 shows an embodiment of cathode flow field plate 210 which is used to provide a flow path that allows the molecular oxygen to interact with catalyst 250. Cathode flow field plate 210 has an inlet 212, an outlet 214 and open-faced channels 216 that define a flow path for an oxidant gas from inlet 212 to outlet 214. Inlet 212 is in fluid communication with inlet 207 of cathode gas input manifold 204 so that oxidant gas flows from oxidant gas supply outlet 410 to inlet 212. As the oxidant gas flows along channels 216, the molecular oxygen contained in the oxidant gas permeates gas diffusion layer 270 to interact with catalyst 250, electrons and protons to form water. The water can pass back through diffusion layer 270, enter the oxidant stream in channels 216, and exit fuel cell 150 via outlet 214 which is in fluid communication with cathode gas output manifold 299.

FIG. 5 shows an embodiment of anode flow field plate 220 which is designed to provide a flow path for a fuel gas that allows the molecular hydrogen to interact with catalyst 240. Anode flow field plate 220 has an inlet 222, outlet 224 and open-faced channels 226 that define a flow path for a fuel gas from inlet 222 to outlet 224. Inlet 222 is in fluid communication with inlet 203 of anode gas input manifold 202. Therefore, in the first operational state of the system, fuel gas flows to inlet 222 from fuel gas outlet 310, and, in the second operational state of the system, oxidant gas flows to inlet 222 from oxidant gas supply outlet 410 or from second oxidant gas supply outlet 460. In the first operational state, the fuel flows along channels 216, and the molecular hydrogen contained in the fuel gas permeates gas diffusion layer 260 to interact with catalyst 240 to form protons and electrons. The protons pass through solid electrolyte 230, and the electrons pass are conducted through gas diffusion layer 260 to anode flow field plate 220, ultimately flowing through an external load to cathode flow field plate 210. The unreacted fuel gas exits fuel cell 150 via outlet 224 which is in fluid communication with anode gas output manifold 298.

Figure 6:
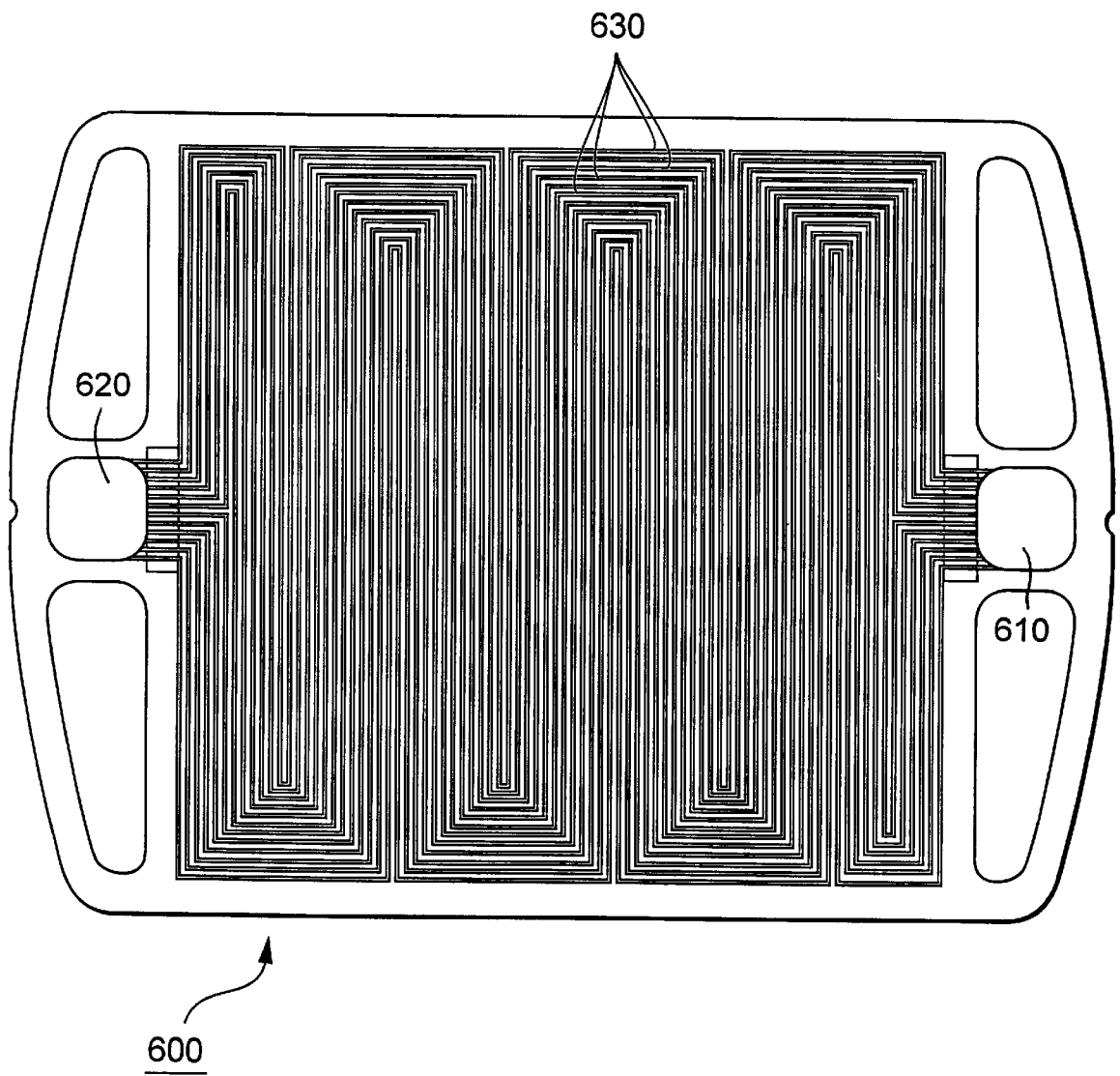
FIG. 6 is an elevational view of an embodiment of a coolant flow field plate.

The heat produced during the fuel cell reaction is removed from fuel cell stack 200 by flowing a coolant through the fuel cell via a coolant flow field plate. FIG. 6 shows an embodiment of coolant flow field plate 600 having an inlet 610, an outlet 620 and open-faced channels 630 that define a flow path for coolant from inlet 610 to outlet 620. The coolant enters fuel cell 150 via inlet 610, flows along channels 630 and absorbs heat, and exits fuel cell 150 via outlet 620.

Although certain embodiments and arrangements of cathode flow field plate 210, anode flow field plate 220 and coolant flow field plate 600 have been described herein, other embodiments and arrangements of these flow field plates can also be used. For example, other embodiments are disclosed in commonly assigned U.S. patent application Ser. No. 09/168,232, now U.S. Pat. No. 6,015,633, entitled "Fuel Cell Assembly Unit for Promoting Fluid Service and Design Flexibility", which is hereby incorporated by reference. In addition, while fuel cell 150 has been described as containing a solid electrolyte (e.g., a proton exchange membrane), the invention is not limited to this type of fuel cell. Those skilled in the art will appreciate that other types of fuel cells can also be used, such as, for example, as solid oxide fuel cells.

The invention can be used in a variety of applications, such as, for example, in automotive systems or in stationary systems. When used in an automotive system, the invention can be put in its second operational state when the automobile is not in use. When used in a stationary system, the invention can be put in its second operational state during periods of low system output power demand. Other applications of the invention will be apparent to those skilled in the art.

While certain embodiments of the invention, as well as their principals of operation, have been disclosed herein, the invention is not limited to these embodiments or these principals of operation. Other embodiments are in the claims.

What is claimed is:

1. A fuel cell system, comprising:

a fuel cell having a cathode flow field plate, an anode flow field plate and an electrolyte between the cathode and anode flow field plates, the cathode flow field plate having an inlet and an outlet and the anode flow field plate having an inlet and an outlet; and a gas distribution system having an oxidant gas inlet for receiving an oxidant gas and an oxidant gas outlet for outputting the oxidant gas, a first fuel gas inlet for receiving a fuel gas, a second fuel gas inlet different than the first fuel gas inlet, and a fuel gas outlet for outputting a fuel gas, the oxidant gas outlet being connected to the inlet of the anode flow field plate, the oxidant gas outlet being connected to the second fuel gas inlet, the fuel gas outlet being connected to the inlet of the anode flow field plate, the gas distribution system including a first valve, a second valve, a third valve and a controller in electrical communication with the first, second and third valves, the first valve having a first position in which the gas distribution system provides a first flow path from the oxidant gas outlet to the inlet of the anode flow field plate and a second position which blocks the first flow path so that the oxidant gas is blocked from flowing from the oxidant gas outlet to the inlet of the anode flow field plate, the second valve having a first position in which the gas distribution system provides a second flow path from the fuel gas outlet to the inlet of the anode flow field plate and a second position which blocks the second flow path so that the fuel gas is blocked from flowing from the fuel gas outlet to the inlet of the anode flow field plate, the second flow path being different than the first flow path, the third valve having a first position in which the gas distribution system provides a third flow path from the oxidant gas outlet to the second fuel gas inlet and a second position which blocks the third flow path so that the oxidant gas is blocked from flowing from the oxidant gas outlet to the second fuel gas inlet, the third flow path being different than the first and second flow paths, wherein during operation the controller sets the positions of the first, second and third valves, and when the controller sets the first valve to its first position the controller sets the second valve to its second position and the third valve to its second position.

2. The fuel cell system of claim 1, wherein the electrolyte comprises a solid electrolyte.

3. The fuel cell system of claim 1, wherein the gas distribution system further comprises a second oxidant gas outlet connected to the inlet of the cathode flow field plate along a fourth flow path different than the first, second and third flow paths.

4. The fuel cell system of claim 1, wherein when the controller sets the first valve to its second position the controller sets the second valve to its first position and the third valve to its first position.

5. The fuel cell system of claim 2, wherein when the controller sets the first valve to its second position the controller sets the second valve to its first position and the third valve to its first position.

6. The fuel cell system of claim 3, wherein when the controller sets the first valve to its second position the controller sets the second valve to its first position and the third valve to its first position.

* * * * *

UNITED STATES PATENT AND TRADEMARK OFFICE
CERTIFICATE OF CORRECTION

PATENT NO.     : 6,299,996 B1
DATED          : October 9, 2001
INVENTOR(S)    : Chock Karuppaiah, Eric T. White and Edward W. Nestler, Jr.

It is certified that error appears in the above-identified patent and that said Letters Patent is hereby corrected as shown below:

<u>Title page,</u>
Item [56], References Cited, U.S. PATENT DOCUMENTS, "5,637,415" replace "Melyser" with -- Meltser --.

Signed and Sealed this

Ninth Day of September, 2003

JAMES E. ROGAN
*Director of the United States Patent and Trademark Office*